(12) United States Patent
Kawabe et al.

(10) Patent No.: US 10,132,541 B2
(45) Date of Patent: Nov. 20, 2018

(54) AIR CONDITIONER AND INSTALLING METHOD OF THE AIR CONDITIONER

(75) Inventors: Yoshikazu Kawabe, Shiga (JP); Akira Fujitaka, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 549 days.

(21) Appl. No.: 13/502,308

(22) PCT Filed: May 27, 2010

(86) PCT No.: PCT/JP2010/003561
§ 371 (c)(1),
(2), (4) Date: Apr. 16, 2012

(87) PCT Pub. No.: WO2011/048722
PCT Pub. Date: Apr. 28, 2011

(65) Prior Publication Data
US 2012/0204586 A1 Aug. 16, 2012

(30) Foreign Application Priority Data

Oct. 19, 2009 (JP) ................................ 2009-240070

(51) Int. Cl.
*F25B 49/02* (2006.01)
*F25B 45/00* (2006.01)
*C09K 5/04* (2006.01)

(52) U.S. Cl.
CPC .............. *F25B 45/00* (2013.01); *C09K 5/045* (2013.01); *C09K 2205/126* (2013.01);
(Continued)

(58) Field of Classification Search
CPC ................ F25B 45/00; F25B 2345/001; F25B 2345/002
(Continued)

(56) References Cited

U.S. PATENT DOCUMENTS 3,785,163 A * 1/1974 Wagner ............................ 62/77
5,813,240 A 9/1998 Sato et al.
(Continued)

FOREIGN PATENT DOCUMENTS

DE 9106946 7/1991
JP 2-187580 7/1990
(Continued)

OTHER PUBLICATIONS

Supplementary European Search Report dated Jul. 10, 2015 in corresponding EP patent application (7 pages total).

*Primary Examiner* — Ljiljana Ciric
*Assistant Examiner* — Alexis Cox
(74) *Attorney, Agent, or Firm* — Hamre, Schumann, Mueller & Larson, P.C.

(57) ABSTRACT

An air conditioner includes a refrigerant charge port provided in an outdoor liquid-side connection valve or an outdoor gas-side connection valve, a liquid-side valve provided between the outdoor liquid-side connection valve and an expansion valve, and a gas-side valve between the indoor gas-side connection valve and a compressor. When an outdoor unit and indoor unit are separated, the liquid-side and gas-side valves are closed, and a refrigerant is charged into an outdoor connection pipe that is closed by the liquid-side valve and the gas-side valve. A control unit is adapted to close the refrigerant charge port, and then open the liquid-side valve and the gas-side valve when a pressure detector detects a predetermined degree of vacuum.

5 Claims, 1 Drawing Sheet

(52) U.S. Cl.
CPC ...... *C09K 2205/22* (2013.01); *C09K 2205/24* (2013.01); *F25B 2400/121* (2013.01); *F25B 2700/191* (2013.01); *Y10T 29/49359* (2015.01)

(58) Field of Classification Search
USPC .......................................................... 62/149
See application file for complete search history.

(56) References Cited

U.S. PATENT DOCUMENTS

| | | | | |
|---|---|---|---|---|
| 6,484,526 | B2* | 11/2002 | Terry ................................ | 62/292 |
| 7,117,688 | B2* | 10/2006 | Matsuoka et al. ............... | 62/292 |
| 7,937,957 | B2* | 5/2011 | McMasters ........................ | 62/77 |
| 2002/0173929 | A1* | 11/2002 | Seigel .................. | A61B 5/0002 |
| | | | | 702/127 |
| 2004/0016252 | A1* | 1/2004 | Singh ........................ | F25B 5/02 |
| | | | | 62/224 |
| 2004/0210419 | A1* | 10/2004 | Wiebe ................... | F25B 49/005 |
| | | | | 702/182 |
| 2006/0179873 | A1* | 8/2006 | Yoshimi et al. ................. | 62/474 |
| 2008/0111100 | A1 | 5/2008 | Thomas et al. | |
| 2008/0157022 | A1 | 7/2008 | Singh et al. | |
| 2009/0242832 | A1* | 10/2009 | Pham ....................... | C07C 21/18 |
| | | | | 252/182.12 |
| 2009/0272135 | A1* | 11/2009 | Nishimura et al. ............. | 62/149 |
| 2009/0320502 | A1* | 12/2009 | Kurihara .................. | F25B 9/008 |
| | | | | 62/78 |
| 2013/0312434 | A1* | 11/2013 | Sanhaji ................... | F25B 45/00 |
| | | | | 62/77 |

FOREIGN PATENT DOCUMENTS

| | | |
|---|---|---|
| JP | 4-169766 | 6/1992 |
| JP | 7-159004 | 6/1995 |
| JP | 2005-195249 | 7/2005 |

* cited by examiner

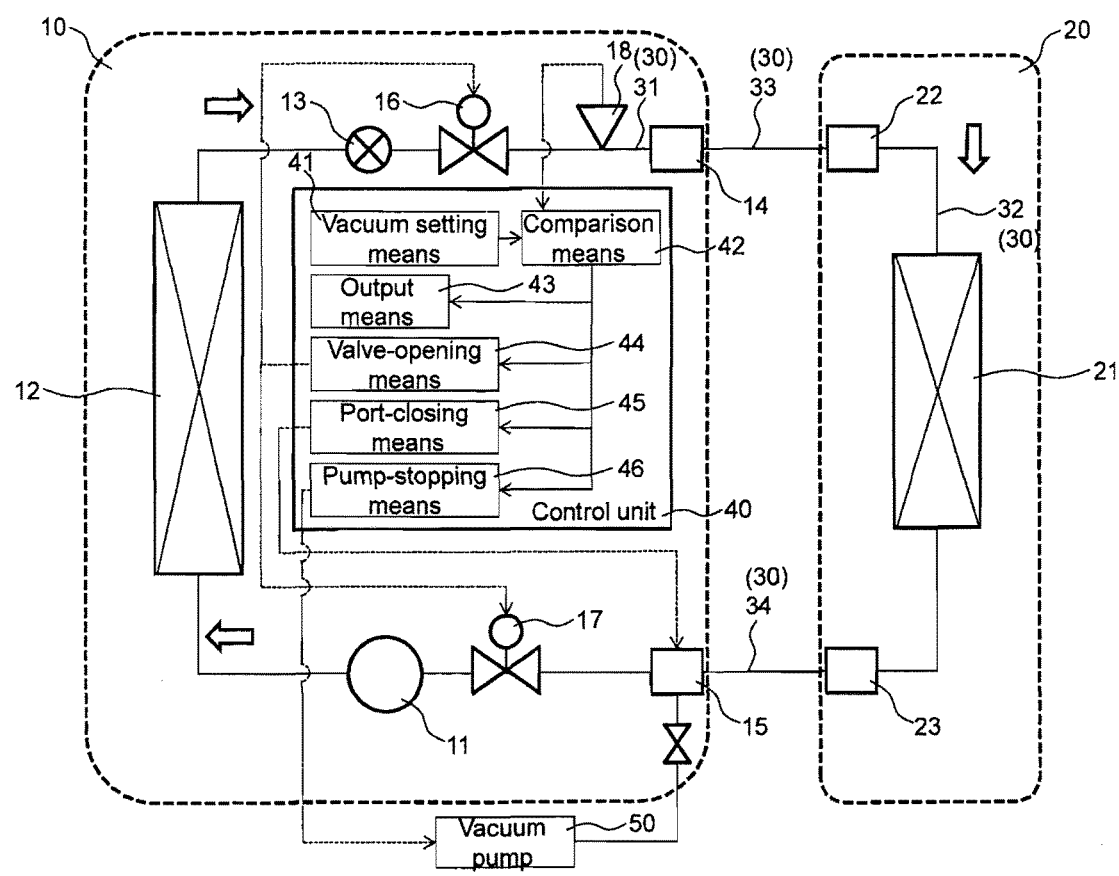

AIR CONDITIONER AND INSTALLING METHOD OF THE AIR CONDITIONER

TECHNICAL FIELD

The present invention relates to an air conditioner which is separated into an indoor unit and an outdoor unit, and an installing method of the air conditioner.

BACKGROUND TECHNIQUE

A conventional separation type air conditioner which is separated into an indoor unit and an outdoor unit, a refrigerant is previously charged into the outdoor unit before the air conditioner is installed. According to a general installing method of the air conditioner, the indoor unit and the outdoor unit are connected to each other through a connection pipe, and after air in the indoor unit and the connection pipe is evacuated, the refrigerant in the outdoor unit is released to the indoor unit.

To eliminate the evacuation operation itself, a technique for charging adsorbent into a refrigeration cycle is proposed (patent document 1 for example).

After destruction of the ozone layer caused by CFC becomes a problem, HCFC is used as an alternate refrigerant, and HFC (R410A) is widely used nowadays, but global warming potential (GWP) of the R410A refrigerant is as high as 2088 and there is a problem from the standpoint of prevention of global warming.

From the standpoint of prevention of global warming, tetrafluoropropene (HFO1234yf) of GWP4 is proposed for example.

PRIOR ART DOCUMENT

Patent Document

[Patent Document 1] Japanese Patent Application Laid-open No. H7-159004

SUMMARY OF THE INVENTION

Problem to be Solved by the Invention

According to the general conventional installing method, the evacuation is not carried out sufficiently or the evacuation is not carried out and a refrigerant in the outdoor unit is released to the indoor unit in some cases.

If it is assumed that the technique of patent document 1 is applied to all of installation styles, a long connection pipe is required depending on installation styles in some cases. In such a case, a large capacity of adsorbent is required, and the air conditioner is increased in size.

If a hydrofluoroolefin-based refrigerant such as HFO1234yf which has double bond and insufficient chemical stability is used when a refrigerant having small global warming potential is utilized from the standpoint of protection of environment, there is a problem that the refrigerant is decomposed due to influence of water and oxygen, material having hydrofluoric acid as a primary ingredient is generated, material to be used and refrigeration oil are degraded, and when worst comes to the worst, the air conditioner breaks down.

Hence, it is an object of the present invention to provide an air conditioner and an installing method of the air conditioner which are suitable for a refrigerant having insufficient chemical stability such as hydrofluoroolefin.

MODE FOR CARRYING OUT THE INVENTION

Means for Solving the Problems

According to an air conditioner of a first aspect, a compressor, an outdoor heat exchanger, an expansion valve and an indoor heat exchanger are connected to one another through pipes to configure a ring-shaped refrigerant circuit, an outdoor unit includes the compressor, the outdoor heat exchanger and the expansion valve, an indoor unit includes the indoor heat exchanger, and the outdoor unit and the indoor unit are connected to each other through a liquid-side connection pipe and a gas-side connection pipe to configure the refrigerant circuit, wherein the air conditioner includes a refrigerant charge port provided in a connection valve connected to the liquid-side connection pipe or the gas-side connection pipe, a liquid-side valve provided on the pipe between the liquid-side connection pipe and the expansion valve, a gas-side valve provided on the pipe between the gas-side connection pipe and the compressor, and a pressure detector provided on the pipe from the liquid-side valve to the indoor heat exchanger or the pipe from the indoor heat exchanger to the gas-side valve, and wherein in a state where the outdoor unit and the indoor unit are not connected to each other, the liquid-side valve and the gas-side valve are closed, and a refrigerant is previously charged into the pipe closed by the liquid-side valve and the gas-side valve.

According to a second aspect, in the air conditioner of the first aspect, the air conditioner further comprises control unit, wherein the control unit closes the refrigerant charge port when the pressure detector detects a predetermined degree of vacuum.

According to a third aspect, in the air conditioner of the second aspect, when the pressure detector detects the predetermined degree of vacuum, the control unit opens the liquid-side valve and the gas-side valve.

According to a fourth aspect, in the air conditioner of the second or third aspect, the control unit stops operation of a vacuum pump which is connected to the refrigerant charge port.

According to a fifth aspect, in the air conditioner of any one of the first to fourth aspects, the air conditioner further comprises output means which informs that the pressure detector detects the predetermined degree of vacuum.

According to a sixth aspect, in the air conditioner of any one of the first to fifth aspects, a single refrigerant of hydrofluoroolefin or a mixture refrigerant having hydrofluoroolefin as a base ingredient is used as the refrigerant.

According to a seventh aspect, in the air conditioner of the sixth aspect, tetrafluoropropene is used as the hydrofluoroolefin, and tetrafluoropropene, difluoromethane and pentafluoroethane are binary mixed or ternary mixed such that global warming potential becomes 5 or more and 750 or less, preferably 300 or less.

According to an installing method of the air conditioner of an eighth aspect, in the installing method of the air conditioner of the first aspect, the method comprises a first step of checking that the pressure detector detects the predetermined degree of vacuum, and a second step of closing the refrigerant charge port after the first step.

According to a ninth aspect, in the installing method of the air conditioner of the eighth aspect, the liquid-side valve and the gas-side valve are opened after the first step.

Effect of the Invention

According to the present invention, when the outdoor unit and the indoor unit are connected to each other at the time of installation and evacuation is carried out from a refrigerant charge port, since a degree of vacuum can be checked by the pressure detector, the evacuation operation can reliably be carried out and therefore, performance at the time of operation can be secured.

BRIEF DESCRIPTION OF THE DRAWINGS

FIG. 1 is a block diagram of an air conditioner according to an embodiment of the present invention.

EXPLANATION OF SYMBOLS 10 outdoor unit
11 compressor
12 outdoor heat exchanger
13 expansion valve
14 outdoor liquid-side connection valve
15 outdoor gas-side connection valve
16 liquid-side valve
17 gas-side valve
18 pressure detector
20 indoor unit
21 indoor heat exchanger
31 pipe
32 pipe
33 liquid-side connection pipe
34 gas-side connection pipe
40 control unit

MODE FOR CARRYING OUT THE INVENTION

According to an air conditioner of the first aspect of the invention, the air conditioner includes a refrigerant charge port provided in a connection valve connected to the liquid-side connection pipe or the gas-side connection pipe, a liquid-side valve provided on the pipe between the liquid-side connection pipe and the expansion valve, a gas-side valve provided on the pipe between the gas-side connection pipe and the compressor, and a pressure detector provided on the pipe from the liquid-side valve to the indoor heat exchanger or the pipe from the indoor heat exchanger to the gas-side valve, and wherein in a state where the outdoor unit and the indoor unit are not connected to each other, the liquid-side valve and the gas-side valve are closed, and a refrigerant is previously charged into the pipe closed by the liquid-side valve and the gas-side valve. According to this aspect, when the outdoor unit and the indoor unit are connected to each other at the time of installation and evacuation is carried out from a refrigerant charge port, since a degree of vacuum can be checked by the pressure detector, the evacuation operation can reliably be carried out and therefore, performance at the time of operation can be secured.

According to a second aspect of the invention, in the air conditioner of the first aspect, the air conditioner further comprises a control unit, wherein the control unit closes the refrigerant charge port when the pressure detector detects a predetermined degree of vacuum. According to this aspect, it is possible to enhance the efficiency of the evacuation operability and to carry out the reliable evacuation.

According to a third aspect of the invention, in the air conditioner of the second aspect, when the pressure detector detects the predetermined degree of vacuum, the control unit opens the liquid-side valve and the gas-side valve. According to this aspect, since the liquid-side valve and the gas-side valve are opened by detection from the pressure detector, operation mistake can be eliminated and the installation operation can be carried out in an optimal vacuum state.

According to a fourth aspect of the invention, in the air conditioner of the second or third aspect, the control unit stops operation of a vacuum pump which is connected to the refrigerant charge port. According to this aspect, it is possible to further enhance the operability and to eliminate the operation mistake.

According to a fifth aspect of the invention, in the air conditioner of any one of the first to fourth aspects, the air conditioner further comprises output means which informs that the pressure detector detects the predetermined degree of vacuum. According to this aspect, it is possible to reliably inform an operator of a predetermined degree of vacuum. Therefore, if an optimal degree of vacuum differs depending upon a refrigerant to be charged, it is possible to enhance the operability and to sufficiently exert the performance of the air conditioner by setting a degree of vacuum in accordance with the charged refrigerant.

According to a sixth aspect of the invention, in the air conditioner of any one of the first to fifth aspects, a single refrigerant of hydrofluoroolefin or a mixture refrigerant having hydrofluoroolefin as a base ingredient is used as the refrigerant. According to this aspect, since the optimal evacuation is reliably carried out, it is possible to use a refrigerant which is cleaved and decomposed due to influence of water and oxygen and which easily generates material having hydrofluoric acid as a primary ingredient.

According to a seventh aspect of the invention, in the air conditioner of the sixth aspect, tetrafluoropropene is used as the hydrofluoroolefin, and tetrafluoropropene, difluoromethane and pentafluoroethane are binary mixed or ternary mixed such that global warming potential becomes 5 or more and 750 or less, preferably 300 or less. According to this aspect, if a refrigerant having small global warming potential is used, even if a refrigerant which is not recovered is released to the atmosphere, it is possible to suppress an influence with respect to global warming to a minimum level.

According to an installing method of the air conditioner of the eighth aspect of the invention, the installing method comprises a first step of checking that the pressure detector detects the predetermined degree of vacuum, and a second step of closing the refrigerant charge port after the first step. According to this aspect, after a degree of vacuum is checked by the pressure detector, the evacuation operation from the refrigerant charge port is completed. Therefore, it is possible to carry out reliable evacuation.

According to a ninth aspect of the invention, in the installing method of the air conditioner of the eighth aspect, the liquid-side valve and the gas-side valve are opened after the first step. According to this aspect, after a degree of vacuum is checked by the pressure detector, the liquid-side valve and the gas-side valve are opened. Therefore, it is possible to carry out the reliable installation operation.

EMBODIMENT

An embodiment of an air conditioner of the present invention will be described below. FIG. 1 is a block diagram of the air conditioner according to the embodiment.

According to the air conditioner of the embodiment, a compressor 11 which compresses a refrigerant, an outdoor heat exchanger 12 which exchanges heat between the refrigerant and heat of outside air, an expansion valve 13 which decompresses the refrigerant, and an indoor heat exchanger 21 which exchanges heat between the refrigerant and heat of air in a room are connected to one another through a pipe 30, thereby configuring a ring-shaped refrigerant circuit.

An outdoor unit 10 includes the compressor 11, the outdoor heat exchanger 12 and the expansion valve 13. The compressor 11, the outdoor heat exchanger 12 and the expansion valve 13 are connected to one another through a pipe 31 of the outdoor unit. An indoor unit 20 includes the indoor heat exchanger 21, and the indoor heat exchanger 21 is connected through a pipe 32. The pipe 31 of the outdoor unit 10 and the pipe 32 of the indoor unit 20 are connected to each other through a liquid-side connection pipe 33 and a gas-side connection pipe 34, thereby configuring the refrigerant circuit. An outdoor liquid-side connection valve 14 and an outdoor gas-side connection valve 15 are provided in the outdoor unit 10. An indoor liquid-side connection valve 22 and an indoor gas-side connection valve 23 are provided in the indoor unit 20. One end of the liquid-side connection pipe 33 is connected to the outdoor liquid-side connection valve 14, and the other end of the liquid-side connection pipe 33 is connected to the indoor liquid-side connection valve 22. One end of the gas-side connection pipe 34 is connected to the outdoor gas-side connection valve 15, and the other end of the gas-side connection pipe 34 is connected to the indoor gas-side connection valve 23. The outdoor gas-side connection valve 15 is provided with a refrigerant charge port, and a vacuum pump 50 can be connected to the refrigerant charge port. Generally, a refrigerant charge port is provided in the outdoor gas-side connection valve 15 in many cases, but a port to which the vacuum pump 50 is connected may be provided in the outdoor 8 liquid-side connection valve 14, the indoor liquid-side connection valve 22 or the indoor gas-side connection valve 23.

A liquid-side valve 16 is provided on the pipe 31 between the expansion valve 13 and the outdoor liquid-side connection valve 14, and a gas-side valve 17 is provided on the pipe 31 between the outdoor gas-side connection valve 15 and the compressor 11. A pressure detector 18 is provided on the pipe 31 between the liquid-side valve 16 and the outdoor liquid-side connection valve 14. The pressure detector 18 may be provided on the pipe 32 or the liquid-side connection pipe 33 between the outdoor liquid-side connection valve 14 and the indoor heat exchanger 21. The pressure detector 18 may be provided on the pipe 32 between the indoor heat exchanger 21 and the gas-side valve 17, or on the gas-side connection pipe 34 or on the pipe 31.

The air conditioner of the embodiment includes a control unit 40 which inputs a detection signal of the pressure detector 18. The control unit 40 includes degree of vacuum setting means 41 capable of previously setting a predetermined degree of vacuum, comparison means 42 which compares, with each other, a detection value of the pressure detector 18 and a value set by the degree of vacuum setting means 41, output means 43 which informs that a degree of vacuum becomes equal to the predetermined degree of vacuum by the comparison means 42, valve-opening means 44 which opens the liquid-side valve 16 and the gas-side valve 17 when the pressure detector 18 detects the predetermined degree of vacuum, port-closing means 45 which closes the refrigerant charge port of the outdoor gas-side connection valve 15 when the pressure detector 18 detects the predetermined degree of vacuum, and pump-stopping means 46 which stops action of the vacuum pump 50 when the pressure detector 18 detects the predetermined degree of vacuum.

A refrigerant having global warming potential smaller than that of a R410A refrigerant is charged into the refrigerant circuit which configures the air conditioner of the embodiment. As this refrigerant, there are a single refrigerant of hydrofluoroolefin and a mixture refrigerant having hydrofluoroolefin as abase ingredient. As a suitable mixture refrigerant, tetrafluoropropene (HFO1234yf) is used as hydrofluoroolefin, and tetrafluoropropene, difluoromethane (R32) and pentafluoroethane (R125) are binary mixed or ternary mixed such that global warming potential becomes 5 or more and 750 or less, preferably 350 or less.

When R32 and HFO1234yf are mixed, since global warming potential of R32 is 675 and global warming potential of HFO1234yf is 4, global warming potential of the mixture is 675 or less irrespective of a mixing ratio thereof.

Although contrivances are required for reducing a pressure loss, if the single HFO1234yf refrigerant is used, global warming potential is largely reduced of course.

Examples of refrigeration oil used for the compressor 1 are synthetic oil containing oxygenated compound of any of polyoxyalkylene glycols, polyvinyl ethers, poly (oxy) alkylene glycol, or copolymer of monoether thereof and polyvinylether, polyolesters and polycarbonates as a primary ingredient, or synthetic oil containing alkylbenzenes or a olefins as a primary ingredient.

The installing method of the air conditioner according to the embodiment will be described below.

In a state of factory shipment, i.e., in a state where the outdoor unit 10 and the indoor unit 20 are not connected to each other, the liquid-side valve 16 and the gas-side valve 17 are closed, and a refrigerant is previously charged into the pipe 31 which is closed by the liquid-side valve 16 and the gas-side valve 17, the compressor 11 connected through the pipe 31, the outdoor heat exchanger 12, and the expansion valve 13.

The outdoor unit 10 and the indoor unit 20 are first installed at installation sites. The outdoor unit 10 and the indoor unit 20 are connected to each other through the liquid-side connection pipe 33 and the gas-side connection pipe 34.

After the outdoor unit 10 and the indoor unit 20 are connected to each other, the vacuum pump 50 is connected to the refrigerant charge port of the outdoor gas-side connection valve 15, and the operation of the vacuum pump 50 is started. When the pump-stopping means 46 is made to function, the pump-stopping means 46 is connected to operation-stopping means of the vacuum pump 50 before the vacuum pump 50 is operated.

The pipe 31 between the liquid-side valve 16 and the outdoor liquid-side connection valve 14, the pipe 31 between the gas-side valve 17 and the outdoor gas-side connection valve 15, the liquid-side connection pipe 33, the gas-side connection pipe 34 and the pipe 32 are evacuated by the operation of the vacuum pump 50.

As the evacuation operation is carried out, a detection signal from the pressure detector 18 is sent to the control unit 40, and the comparison means 42 compares whether a degree of vacuum reaches a value set by the degree of vacuum setting means 41.

When the pressure detector 18 detects a predetermined degree of vacuum, the output means 43 informs that the degree of vacuum reaches the predetermined degree of vacuum by means of visual display, light, sound or vibration.

If the operator checks that the pressure detector 18 detects the predetermined degree of vacuum by the output means 43, the refrigerant charge port is closed and the vacuum pump 50 is taken out, and the liquid-side valve 16 and the gas-side valve 17 are opened.

If an optimal degree of vacuum differs depending upon a refrigerant to be charged, it is possible to enhance the operability and to sufficiently exert the performance of the air conditioner by setting a degree of vacuum in accordance with the charged refrigerant by the degree of vacuum setting means 41.

The installing method of an air conditioner according to the embodiment includes a first step of checking that the pressure detector 18 detects a predetermined degree of vacuum and a second step of closing the refrigerant charge port after the first step. According to this, since the evacuation operation from the refrigerant charge port is completed after the degree of vacuum is checked by the pressure detector 18, reliable evacuation can be carried out.

Since the liquid-side valve 16 and the gas-side valve 17 are opened after the first step, reliable installation operation can be carried out.

When the valve-opening means 44 and the port-closing means 45 are made to function by the control unit 40, if the comparison means 42 determines that a degree of vacuum is equal to the predetermined degree of vacuum, the liquid-side valve 16 and the gas-side valve 17 are opened by a signal from the valve-opening means 44 after the refrigerant charge port of the outdoor gas-side connection valve 15 is closed by a signal from the port-closing means 45.

When the pump-stopping means 46 is made to function by the control unit 40, if the comparison means 42 determines that a degree of vacuum is equal to the predetermined degree of vacuum, the operation of the vacuum pump 50 is stopped by a signal from the pump-stopping means 46.

When the pressure detector 18 detects a predetermined degree of vacuum, since the air conditioner of the embodiment includes the control unit 40 which closes the refrigerant charge port, it is possible to enhance the efficiency of the evacuation operation and to carry out reliable evacuation.

According to the air conditioner of the embodiment, since the liquid-side valve 16 and the gas-side valve 17 are opened by the detection from the pressure detector 18, it is possible to eliminate operation mistake and to carry out the installation operation in an optimal vacuum state.

According to the air conditioner of the embodiment, since the operation of the vacuum pump 50 connected to the charge port is stopped by the control unit 40, it is possible to further enhance the operability and to eliminate the operation mistake.

Although the embodiment is described using the refrigerant circuit which utilizes the outdoor heat exchanger 12 as a condenser and using the indoor heat exchanger 21 as an evaporator, the outlet side pipe 31 and the suction side pipe 31 of the compressor 11 may be provided with four-way valves, the outdoor heat exchanger 12 may be utilized as an evaporator and the indoor heat exchanger 21 may be utilized as a condenser.

INDUSTRIAL APPLICABILITY

The present invention is suitable when a refrigerant which is prone to be decomposed or degenerated by existence of air or water such as HFO1234yf having global warming potential 4 is utilized.

The invention claimed is:
1. An air conditioner, comprising:
a compressor, an outdoor heat exchanger, an expansion valve and an indoor heat exchanger that are configured to be connected to one another through a liquid-side connection pipe and a gas-side connection pipe to form a refrigerant circuit for operation, wherein an outdoor unit includes the compressor, the outdoor heat exchanger and the expansion valve, with refrigerant flowing in operation from the compressor to the outdoor heat exchanger to the expansion valve, an indoor unit includes the indoor heat exchanger, and the outdoor unit and the indoor unit are configured to be connected to each other through the liquid-side connection pipe and the gas-side connection pipe to form the refrigerant circuit for operation;
an outdoor liquid-side connection valve provided in the outdoor unit and directly connected to the liquid-side connection pipe;
an outdoor gas-side connection valve provided in the outdoor unit and directly connected to the gas-side connection pipe;
a refrigerant charge port provided in the outdoor liquid-side connection valve or the outdoor gas-side connection valve;
a liquid-side valve provided upstream from the outdoor liquid-side connection valve and downstream from the expansion valve;
a gas-side valve provided downstream from the outdoor gas-side connection valve and upstream from the compressor;
a pressure detector provided downstream from the liquid-side valve and upstream from the outdoor liquid-side valve, to detect a degree of vacuum of:
a first pipe disposed downstream from the liquid-side valve and upstream from the outdoor liquid-side connection valve,
the liquid-side connection pipe,
a second pipe disposed downstream from the indoor liquid-side valve and upstream from the indoor-side heat exchanger,
the indoor-side heat exchanger,
a third pipe disposed downstream from the indoor-side heat exchanger and upstream from the indoor gas-side connection valve,
the gas-side connection pipe, and
a fourth pipe disposed downstream from the outdoor gas-side connection valve and upstream from the gas-side valve; and
a control unit that is configured to close the refrigerant charge port and then open the liquid-side valve and the gas-side valve when the pressure detector detects a predetermined degree of vacuum when in a state where the liquid-side valve and the gas-side valve are closed, and a refrigerant is charged into:
a fifth pipe disposed upstream from the liquid-side valve and downstream from the expansion valve,
the expansion valve,
a sixth pipe disposed upstream from the expansion valve and downstream from the outdoor-side heat exchanger,
the outdoor-side heat exchanger,
a seventh pipe disposed upstream from the outdoor-side heat exchanger and downstream from the compressor,
the compressor, and
an eighth pipe disposed upstream from the compressor and downstream from the gas-side valve, which is closed by the compressor and the gas-side valve.
2. The air conditioner according to claim 1, wherein the control unit is further configured to stop operation of a vacuum pump that is connected to the refrigerant charge port for producing the predetermined degree of vacuum.

3. The air conditioner according to claim 1, further comprising an output unit that outputs a signal indicating that the pressure detector detects the predetermined degree of vacuum.

4. The air conditioner according to claim 1, wherein a single refrigerant of hydrofluoroolefin or a refrigerant mixture having hydrofluoroolefin as a basic ingredient is used as the refrigerant.

5. The air conditioner according to claim 4, wherein tetrafluoropropene is used as the hydrofluoroolefin.

* * * * *